(12) United States Patent
Zhuang et al.

(10) Patent No.: US 11,997,016 B2
(45) Date of Patent: *May 28, 2024

(54) ROUTING CONTROL METHOD, NETWORK DEVICE, AND CONTROLLER

(71) Applicant: HUAWEI TECHNOLOGIES CO., LTD., Guangdong (CN)

(72) Inventors: Shunwan Zhuang, Beijing (CN); Chang Wang, Beijing (CN); Nan Wu, Beijing (CN); Zhenbin Li, Beijing (CN); Hui Ni, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/746,199

(22) Filed: May 17, 2022

(65) Prior Publication Data

US 2023/0111267 A1  Apr. 13, 2023

Related U.S. Application Data

(63) Continuation of application No. 16/887,299, filed on May 29, 2020, now Pat. No. 11,349,759, which is a (Continued)

(30) Foreign Application Priority Data

Mar. 31, 2016 (CN) .......................... 201610204188.0

(51) Int. Cl.
*H04L 45/02* (2022.01)
*H04L 45/00* (2022.01)
(Continued)

(52) U.S. Cl.
CPC ............ *H04L 45/745* (2013.01); *H04L 45/04* (2013.01); *H04L 45/26* (2013.01); *H04L 45/54* (2013.01); *H04L 45/748* (2013.01)

(58) Field of Classification Search
CPC ....... H04L 45/745; H04L 45/26; H04L 45/04; H04L 45/54; H04L 45/748
See application file for complete search history.

(56) References Cited

U.S. PATENT DOCUMENTS

| 2004/0006640 A1* | 1/2004 | Inderieden ............. H04L 45/52 709/242 |
| 2006/0149853 A1 | 7/2006 | Shankara |

(Continued)

FOREIGN PATENT DOCUMENTS

| CN | 1402488 A | 3/2003 |
| CN | 1949746 A | 4/2007 |

(Continued)

OTHER PUBLICATIONS

K. Lougheed et al., A Border Gateway Protocol (BGP). RFC1105, Jun. 1989, 17 pages.

(Continued)

*Primary Examiner* — Chi Ho A Lee
(74) *Attorney, Agent, or Firm* — WOMBLE BOND DICKINSON (US) LLP

(57) ABSTRACT

Embodiments of the present disclosure provide a routing control method, network device, and controller. The method may include the network device obtaining a route suppression request. The method may also include determining the second routing entry. Furthermore, the method may include setting a state of the second routing entry to a non-delivery state that is used to indicate that the second routing entry does not need to be delivered to a forwarding table. In the method, the network device may have a first routing entry and a second routing entry, an address prefix of the first routing entry is a first address prefix, an address prefix of the second routing entry is a second address prefix, a network segment to which the second address prefix belongs is a subset of a network segment to which the first address prefix (Continued)

belongs, and a mask in the second address prefix is greater than a mask in the first address prefix.

24 Claims, 8 Drawing Sheets

Related U.S. Application Data continuation of application No. 16/147,179, filed on Sep. 28, 2018, now Pat. No. 10,700,973, which is a continuation of application No. PCT/CN2017/076963, filed on Mar. 16, 2017.

(51) Int. Cl.
*H04L 45/745* (2022.01)
*H04L 45/748* (2022.01)

(56) References Cited

U.S. PATENT DOCUMENTS

| | | |
|---|---|---|
| 2006/0209851 A1 | 9/2006 | Scudder et al. |
| 2006/0268681 A1 | 11/2006 | Raza |
| 2007/0014293 A1 | 1/2007 | Filsfils et al. |
| 2009/0234841 A1 | 9/2009 | Watanabe |
| 2010/0257576 A1 | 10/2010 | Valente et al. |
| 2010/0265956 A1 | 10/2010 | Li |
| 2015/0103662 A1 | 4/2015 | Valero et al. |
| 2015/0124806 A1 | 5/2015 | Banerjee et al. |
| 2015/0222734 A1 | 8/2015 | Inada |
| 2015/0249596 A1 | 9/2015 | Ogihara |
| 2016/0014024 A1 | 1/2016 | You et al. |
| 2016/0043960 A1 | 2/2016 | Solis |
| 2016/0182300 A1* | 6/2016 | Mopuri .............. H04L 41/0896 370/235 |
| 2016/0315857 A1* | 10/2016 | Lubashev ........... H04L 12/6418 |
| 2017/0104678 A1 | 4/2017 | Dale |
| 2017/0155587 A1 | 6/2017 | Bannister |
| 2017/0366457 A1 | 12/2017 | Wang |

FOREIGN PATENT DOCUMENTS

| | | |
|---|---|---|
| CN | 105721303 A | 6/2016 |
| EP | 2933958 A1 | 10/2015 |
| WO | 02061625 A2 | 8/2002 |
| WO | 2011021145 A1 | 2/2011 |

OTHER PUBLICATIONS

K. Lougheed et al, A Border Gateway Protocol (BGP). RFC1163, Jun. 1990, 29 pages.
K. Lougheed et al, A Border Gateway Protocol 3 (BGP-3). RFC1267, Oct. 1991, 35 pages.
Y. Rekhter et al., A Border Gateway Protocol 4 (BGP-4). RFC4271, Jan. 2006, 104 pages.
T. Bates et al., Multiprotocol Extensions for BGP-4. RFC4760, Jan. 2007, 12 pages.
P. Marques et al., Dissemination of Flow Specification Rules. RFC5575, Aug. 2009, 22 pages.
R. Raszuk et al, Dissemination of Flow Specification Rules for IPv6 draft-ietf-idr-flow-spec-v6-06, Nov. 10, 2014, 9 pages.
R. White et al., "Bounding Longer Routes to Remove TE, draft-white-bounded-longest-match-02", Jul. 31, 2008, KP015060111, 9 pages.

* cited by examiner

ROUTING CONTROL METHOD, NETWORK DEVICE, AND CONTROLLER

CROSS-REFERENCE TO RELATED APPLICATIONS

This application is a continuation of U.S. patent application Ser. No. 16/887,299 filed on May 29, 2020, which is a continuation of U.S. patent application Ser. No. 16/147,179, filed on Sep. 28, 2018, now U.S. Pat. No. 10,700,973, which is a continuation of International Application No. PCT/CN2017/076963, filed on Mar. 16, 2017, which claims priority to Chinese Patent Application No. 201610204188.0, filed on Mar. 31, 2016. All of the aforementioned applications are hereby incorporated by reference in their entireties.

TECHNICAL FIELD

The present application relates to the field of communications technologies, and in particular, to a routing control method, a network device, and a controller.

BACKGROUND

A forwarding device usually has a forwarding entry that is also referred to as a forwarding information base (FIB) entry. When forwarding a packet, the forwarding device matches a destination address of the packet with an address prefix of a forwarding entry to obtain a matched forwarding entry, and thereby determines a route of the packet based on the matched forwarding entry.

Currently, the forwarding device usually determines a route according to a longest match rule. To be specific, the forwarding device selects a forwarding entry with a longest mask from the forwarding entry that matches the destination address, and determines the route of the packet based on the forwarding entry with a longest mask.

However, in some scenarios, research has found that the route of the packet determined based on the forwarding entry with a longest mask is often not an optimal route. However, currently there is no routing control used to select a route corresponding to a short mask.

SUMMARY

To resolve the foregoing technical problems, embodiments of the present invention provide a routing control method, a network device, and a controller, so as to select, by suppressing a route corresponding to a long mask, a route corresponding to a short mask.

In view of this, in the embodiments of the present invention, technical solutions used to resolve the technical problem are as follows:

According to a first aspect, an embodiment of the present invention provides a routing control method, where a network device has a first routing entry and a second routing entry, an address prefix of the first routing entry is a first address prefix, an address prefix of the second routing entry is a second address prefix, a network segment to which the second address prefix belongs is a subset of a network segment to which the first address prefix belongs, a mask in the second address prefix is greater than a mask in the first address prefix, and the method includes:

obtaining, by a control module of the network device, a route suppression request;

determining, by the control module, the second routing entry; and setting, by the control module, a state of the second routing entry to a non-delivery state, where the non-delivery state is used to indicate that the second routing entry does not need to be delivered to a forwarding table.

In a first possible embodiment of the first aspect, the setting, by the control module, a state of the second routing entry to a non-delivery state includes:

setting, by the control module, the second routing entry to an in-active state, or setting the second routing entry to a rib-only state in an active state.

With reference to the first aspect or the first possible embodiment of the first aspect, in a second possible embodiment of the first aspect, the route suppression request is a Border Gateway Protocol (BGP) flow specification (Flow-Spec) message, network layer reachability information (NLRI) of the BGP FlowSpec message carries an address match, an extended community attribute of the BGP FlowSpec message carries a suppression action corresponding to the address match, and the address match is the first address prefix or the second address prefix; and the setting, by the control module, a state of the second routing entry to a non-delivery state includes:

setting, by the control module, the state of the second routing entry to the non-delivery state based on the suppression action.

With reference to the first aspect or the first possible embodiment of the first aspect, in a third possible embodiment of the first aspect, the route suppression request is a configuration command, the configuration command carries an address match and a suppression action corresponding to the address match, and the address match is the first address prefix or the second address prefix; and the setting, by the control module, a state of the second routing entry to a non-delivery state includes:

setting, by the control module, the state of the second routing entry to the non-delivery state based on the suppression action.

With reference to the first aspect or the first possible embodiment of the first aspect, in a fourth possible embodiment of the first aspect, before the setting, by the control module, a state of the second routing entry to a non-delivery state, the method further includes:

determining, by the control module, that the first routing entry is in a delivery state in an active state.

With reference to the fourth possible embodiment of the first aspect, in a fifth possible embodiment of the first aspect, after the setting, by the control module, a state of the second routing entry to a non-delivery state, the method further includes:

delivering, by the control module, the first routing entry to the forwarding table.

With reference to the first aspect or the first possible embodiment of the first aspect, in a sixth possible embodiment of the first aspect, the network device is a physical forwarding device, and the control module is a control module of the physical forwarding device; or the network device is a first virtual machine deployed on a general physical server, and the control module is a control module of the first virtual machine; or the network device includes a second virtual machine deployed on a general physical server, and the control module is the second virtual machine.

According to a second aspect, an embodiment of the present invention provides a routing control method, where the method includes:

delivering, by a controller, a first routing entry and a second routing entry to a control module of a network device, where an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix;

determining, by the controller, the second routing entry; and sending, by the controller, a route suppression request to the control module, where the route suppression request is used to instruct the control module to set a state of the second routing entry to a non-delivery state, and the non-delivery state is used to indicate that the second routing entry does not need to be delivered to a forwarding table.

In a first possible embodiment of the second aspect, the route suppression request is used to instruct the control module to set the second routing entry to an in-active state, or set the second routing entry to a rib-only state in an active state.

With reference to the second aspect or the first possible embodiment of the second aspect, in a second possible implementation of the first aspect, the route suppression request is a Border Gateway Protocol (BGP) flow specification (FlowSpec) message, network layer reachability information (NLRI) of the BGP FlowSpec message carries an address match, an extended community attribute of the BGP FlowSpec message carries a suppression action corresponding to the address match, the suppression action is used to instruct the control module to set the state of the second routing entry to the non-delivery state based on the suppression action, and the address match is the first address prefix or the second address prefix.

With reference to the second aspect or the first possible embodiment of the second aspect, in a third possible embodiment of the first aspect, the route suppression request is a configuration command, the configuration command carries an address match and a suppression action corresponding to the address match, the suppression action is used to instruct the control module to set the state of the second routing entry to the non-delivery state based on the suppression action, and the address match is the first address prefix or the second address prefix.

With reference to the second aspect or the first possible embodiment of the second aspect, in a fourth possible embodiment of the first aspect, the controller is a controller that has a dedicated hardware structure, a controller implemented by installing software on a general physical server, or a virtual machine deployed on a general physical server.

According to a third aspect, an embodiment of the present invention provides a network device, where the network device has a first routing entry and a second routing entry, an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix; and the network device includes a control module, where the control module includes an obtaining unit, a determining unit, and a setting unit, where the obtaining unit is configured to obtain a route suppression request;

the determining unit is configured to determine the second routing entry; and the setting unit is configured to set a state of the second routing entry to a non-delivery state, where the non-delivery state is used to indicate that the second routing entry does not need to be delivered to a forwarding table.

In a first possible embodiment of the third aspect, the setting unit is specifically configured to: set the second routing entry to an in-active state, or set the second routing entry to a rib-only state in an active state.

With reference to the third aspect or the first possible embodiment of the third aspect, in a second possible implementation of the third aspect, the route suppression request is a Border Gateway Protocol (BGP) flow specification (FlowSpec) message, network layer reachability information (NLRI) of the BGP FlowSpec message carries an address match, an extended community attribute of the BGP FlowSpec message carries a suppression action corresponding to the address match, and the address match is the first address prefix or the second address prefix; and the setting unit is specifically configured to set the state of the second routing entry to the non-delivery state based on the suppression action.

With reference to the third aspect or the first possible embodiment of the third aspect, in a third possible embodiment of the third aspect, the route suppression request is a configuration command, the configuration command carries an address match and a suppression action corresponding to the address match, and the address match is the first address prefix or the second address prefix; and the setting unit is specifically configured to set the state of the second routing entry to the non-delivery state based on the suppression action.

With reference to the third aspect or the first possible embodiment of the third aspect, in a fourth possible embodiment of the third aspect, the determining unit is further configured to: before the setting unit sets the state of the second routing entry to the non-delivery state, determine that the first routing entry is in a delivery state in an active state.

With reference to the fourth possible embodiment of the third aspect, in a fifth possible embodiment of the third aspect, the network device further includes a delivery unit, where the delivery unit is configured to deliver the first routing entry to the forwarding table after the setting unit sets the state of the second routing entry to the non-delivery state.

With reference to the third aspect or the first possible embodiment of the third aspect, in a sixth possible embodiment of the third aspect, the network device is a physical forwarding device, and the control module is a control module of the physical forwarding device; or the network device is a first virtual machine deployed on a general physical server, and the control module is a control module of the first virtual machine; or the network device includes a second virtual machine deployed on a general physical server, and the control module is the second virtual machine.

According to a fourth aspect, an embodiment of the present invention provides a controller, including a delivery unit, a determining unit, and a sending unit, where the delivery unit is configured to deliver a first routing entry and a second routing entry to a control module of a network device, where an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix;

the determining unit is configured to determine the second routing entry; and the sending unit is configured to send a route suppression request to the control module, where the route suppression request is used to instruct the control module to set a state of the second routing entry to a non-delivery state, and the non-delivery state is used to indicate that the second routing entry does not need to be delivered to a forwarding table.

In a first possible embodiment of the fourth aspect, the route suppression request is used to instruct the control module to set the second routing entry to an in-active state, or set the second routing entry to a rib-only state in an active state.

With reference to the fourth aspect or the first possible embodiment of the fourth aspect, in a second possible embodiment of the third aspect, the route suppression request is a Border Gateway Protocol (BGP) flow specification (FlowSpec) message, network layer reachability information (NLRI) of the BGP FlowSpec message carries an address match, an extended community attribute of the BGP FlowSpec message carries a suppression action corresponding to the address match, the suppression action is used to instruct the control module to set the state of the second routing entry to the non-delivery state based on the suppression action, and the address match is the first address prefix or the second address prefix.

With reference to the fourth aspect or the first possible embodiment of the fourth aspect, in a third possible embodiment of the third aspect, the route suppression request is a configuration command, the configuration command carries an address match and a suppression action corresponding to the address match, the suppression action is used to instruct the control module to set the state of the second routing entry to the non-delivery state based on the suppression action, and the address match is the first address prefix or the second address prefix.

With reference to the fourth aspect or the first possible embodiment of the fourth aspect, in a fourth possible embodiment of the third aspect, the controller is a controller that has a dedicated hardware structure, a controller implemented by installing software on a general physical server, or a virtual machine deployed on a general physical server.

According to a fourth aspect, an embodiment of the present invention provides a network system, including any possible embodiment of the foregoing network device and any possible embodiment of the foregoing controller.

It can be learned from the foregoing technical solutions that, in the embodiments of the present invention, the network device has the first routing entry and the second routing entry, the address prefix of the first routing entry is the first address prefix, the address prefix of the second routing entry is the second address prefix, the mask in the second address prefix is greater than the mask in the first address prefix, and the network segment to which the second address prefix belongs is the subset of the network segment to which the first address prefix belongs. After obtaining the route suppression request, the control module of the network device can determine the second routing entry, and set the state of the second routing entry to the non-delivery state to indicate that the second routing entry does not need to be delivered to the forwarding table. A route corresponding to the second routing entry is a route corresponding to a long mask. Therefore, when a packet is to be forwarded, the route corresponding to the long mask is not selected for the packet based on the second routing entry, so as to select, by suppressing the route corresponding to the long mask, a route corresponding to a short mask.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may derive other drawings from these accompanying drawings without creative efforts.

DESCRIPTION OF EMBODIMENTS

Figure 1:
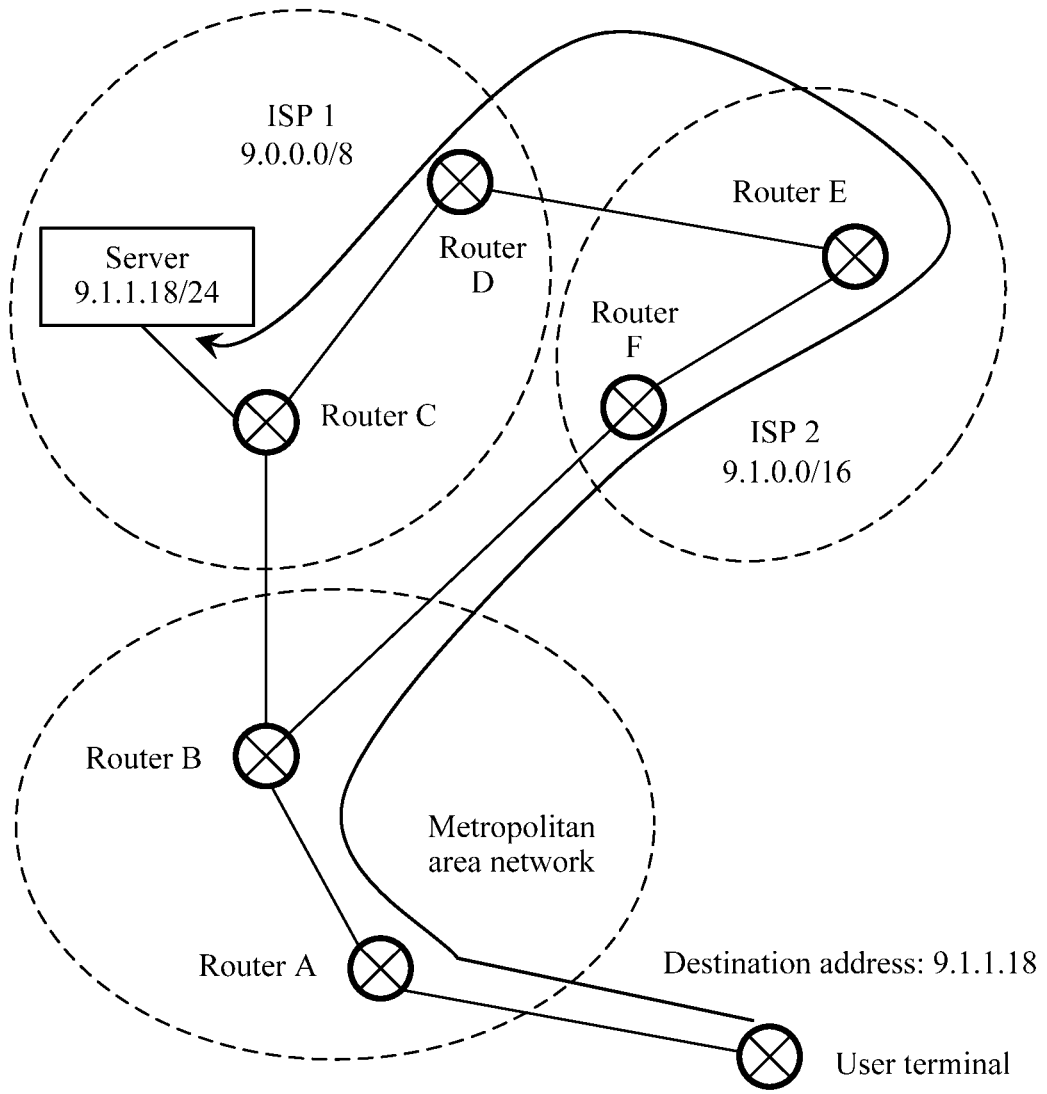
FIG. 1 is a schematic diagram of packet routing in the prior art.

A routing table (also referred to as a RIB table) and a forwarding table (also referred to as a FIB table) are two types of tables commonly used in a forwarding process. After calculating a routing table, a control plane delivers an entry in the routing table to a forwarding table of a forwarding plane, to indicate forwarding of a packet. For example, Table 1 shows the routing table calculated by the control plane.

TABLE 1

| Address prefix (Destination/ Mask) | Precedence (Pre) | Cost (Cost) | Flag bit (Flags) | Next hop (Next hop) | Outbound interface (Interface) | Entry state |
|---|---|---|---|---|---|---|
| 0.0.0.0/0 | 60 | 0 | D | 120.0.0.2 | Port 1 | Delivery state in an active (Active) state |
| 8.0.0.0/8 | 100 | 3 | D | 120.0.0.2 | Port 1 | Delivery state in an active state |
| 9.0.0.0/8 | 10 | 80 | D | 20.0.0.2 | Port 2 | Delivery state in an active state |
| 9.1.0.0/16 | 100 | 4 | D | 120.0.0.2 | Port 3 | Delivery state in an active state |
| 20.0.0.0/8 | 0 | 0 | D | 20.0.0.1 | Port 2 | Delivery state in an active state |

After all entries in Table 1 are delivered to the forwarding plane, a forwarding table shown in Table 2 is obtained.

TABLE 2

| Address prefix (Destination/ Mask) | Next hop (Next hop) | Flag bit (Flag) | Outbound interface (Interface) | Tunnel identifier (Tunnel ID) |
|---|---|---|---|---|
| 0.0.0.0/0 | 120.0.0.2 | SU | Port 1 | 0 × 0 |
| 8.0.0.0/8 | 120.0.0.2 | DU | Port 1 | 0 × 0 |
| 9.0.0.0/8 | 20.0.0.2 | DU | Port 2 | 0 × 0 |
| 9.1.0.0/16 | 120.0.0.2 | DU | Port 3 | 0 × 0 |
| 20.0.0.0/8 | 20.0.0.1 | U | Port 2 | 0 × 0 |

When forwarding a packet based on, for example, the forwarding table shown in Table 2, the forwarding plane matches a destination address of the packet with an address prefix of each forwarding entry in the forwarding table to determine a matched forwarding entry, and determines a route of the packet based on the matched forwarding entry. Currently, the forwarding plane usually determines a route according to a longest match rule. To be specific, the forwarding plane determines a forwarding entry with a longest mask from the forwarding entry that matches the destination address, and determines the route of the packet based on the forwarding entry with a longest mask. In other words, it is equivalent to selecting a route corresponding to a long mask. The address prefix may include two parts: an address and a mask. For example, a format of the address prefix is an Internet Protocol (IP) address/mask.

For example, if the destination address of the packet is 9.1.1.18, the forwarding plane matches the destination address 9.1.1.18 with an address prefix of each entry in Table 2 in an order of masks from long to short. When determining that an address prefix 9.1.0.0/16 matches the destination address 9.1.1.18, the forwarding plane no longer continues matching, but determines an entry corresponding to the address prefix 9.1.0.0/16, and determines a route based on a next hop 120.0.0.2 corresponding to the entry, to be specific, forwards the packet to the next hop 120.0.0.2.

However, the inventor finds, through research, that in some scenarios, the route that is of the packet and determined based on the forwarding entry with a longest mask is often not an optimal route. For example, in a scenario shown in FIG. 1, a metropolitan area network includes a router A and a router B. An Internet service provider (ISP) 1 includes a router C and a router D, and an ISP 2 includes a router E and a router F. In addition, the ISP 1 advertises an address prefix 9.0.0.0/8 to the metropolitan area network, and the ISP 1 also advertises an address prefix 9.1.0.0/16 to the ISP 2. The address prefix is advertised to the metropolitan area network by using the ISP 2. An address prefix of a server is 9.1.1.18/24. When a user terminal needs to send a packet whose destination address is 9.1.1.18, the router A sends the packet to the router B, and the router B sends, based on the forwarding table shown in Table 2, the packet to a corresponding next-hop address 120.0.0.2, that is, an address of the router F, so that the packet is sent to the ISP 2, and finally is sent, by using the router E, the router D, and the router C, to the server connected to the ISP 1. However, because a route forwarded from the ISP 2 has more costs, higher charging, poorer transmission quality, or the like, the route for forwarding the packet to the ISP 2 may not be an optimal route. However, currently, there is no routing control manner that can be used to select a route corresponding to a short mask.

To resolve the foregoing technical problems, the embodiments of the present invention provide a routing control method, a network device, and a controller, so as to select, by suppressing a route corresponding to a long mask, a route corresponding to a short mask.

The following describes the technical solutions in the embodiments of the present invention with reference to the accompanying drawings in the embodiments of the present invention. The described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and the like are intended to distinguish between similar objects, but do not indicate a specific order or sequence. It should be understood that data termed in such a way is interchangeable in proper circumstances, so that the embodiments described herein can be implemented in other orders than the order illustrated or described herein. In addition, the terms "include", "have", and any other variants thereof mean to cover the non-exclusive inclusion, for example, a process, method, system, product, or device that includes a series of steps or units is not necessarily limited to those expressly listed steps or units, but may include other steps or units not expressly listed or inherent to those processes, methods, products, or devices.

Figure 2:
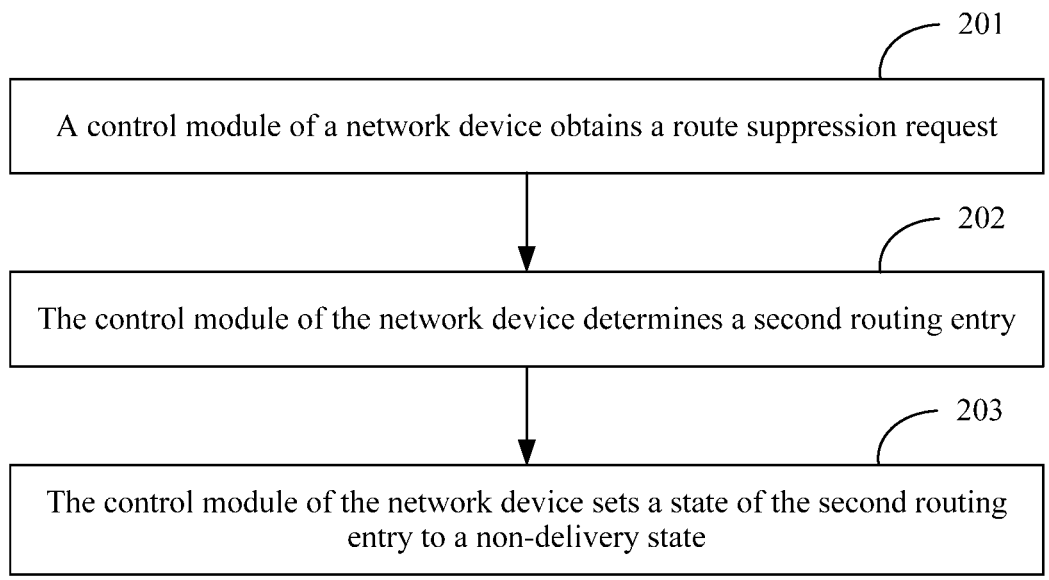
FIG. 2 is a schematic flowchart of a method embodiment according to an embodiment of the present invention.

Referring to FIG. 2, an embodiment of the present invention provides a method embodiment of a routing control method. This embodiment may be applied to a network device.

The network device, such as a control module of the network device, has a first routing entry and a second routing entry. An address prefix of the first routing entry is a first address prefix. An address prefix of the second routing entry is a second address prefix. Both the first address prefix and the second address prefix are used to match a destination address of a packet. A mask in the second address prefix is greater than a mask in the first address prefix. To be specific, a route corresponding to the first routing entry is a route corresponding to a short mask, and a route corresponding to the second routing entry is a route corresponding to a long mask. In addition, a network segment to which the second address prefix belongs is a network segment U1, and a network segment to which the first address prefix belongs is a network segment U2. The network segment U1 is a subset of the network segment U2. In other words, the network segment U2 includes the network segment U1. To be specific, an IP address belonging to the network segment U2 certainly belongs to the network segment U1, but an IP address belonging to the network segment U1 may belong to the network segment U2, or may not belong to the network segment U2. The network segment mentioned in this embodiment of the present invention is a network segment having a largest range.

For example, the first address prefix may be 9.0.0.0/8, and the second address prefix may be 9.1.0.0/16. It can be learned that a mask 16 is greater than a mask 8. In addition, a network segment to which 9.1.0.0/16 belongs is a network segment 9.1.0.0-9.1.255.255, a network segment to which 9.0.0.0/8 belongs is a network segment 9.0.0.0-9.255.255.255, and the network segment 9.1.0.0-9.1.255.255 is a subset of the network segment 9.0.0.0-9.255.255.255. In addition, because the network segment to which the second address prefix belongs is the subset of the network segment to which the first address prefix belongs, the destination address of the packet certainly matches the first routing entry if the destination address matches the second routing entry. For example, if the destination address of the packet is 9.1.1.18, the packet matches both 9.0.0.0/8 and 9.1.0.0/16. It should be noted that the long mask and the short mask mentioned in this embodiment of the present invention are relative to each other. For example, for the masks 8 and 16, 16 is a long mask, and 8 is a short mask.

In this embodiment of the present invention, in addition to the address prefix, the first routing entry and the second routing entry may have information such as a next-hop address and an entry state. The next-hop address is used to indicate a next-hop route, the entry state is used to indicate whether a forwarding entry needs to be delivered, and so on.

Figure 3:
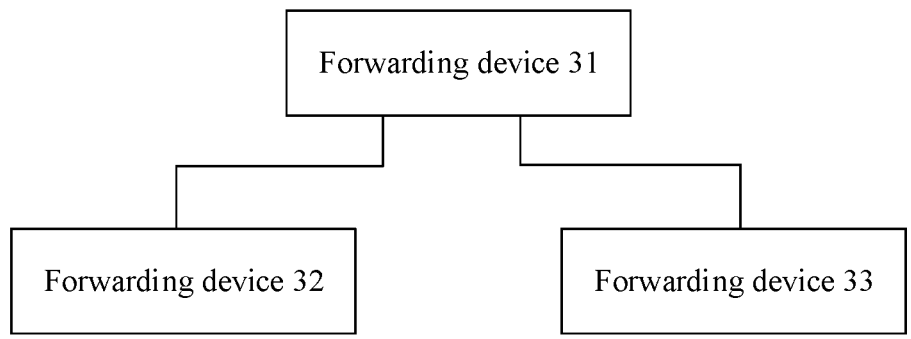
FIG. 3 is a schematic structural diagram of a forwarding system according to an embodiment of the present invention.

For example, the network device may be a forwarding device 31 shown in FIG. 3, and the forwarding device 31 is separately connected to a forwarding device 32 and a forwarding device 33. The first routing entry and the second routing entry may be shown in Table 3. A next-hop address of the first routing entry is an address of the forwarding device 32. To be specific, the first routing entry is used to indicate that the packet is to be forwarded to the forwarding device 32. A next-hop address of the second routing entry is an address of the forwarding device 33. To be specific, the second routing entry is used to indicate that the packet is to be forwarded to the forwarding device 33. An initial entry state of each of the first routing entry and the second routing entry may be a delivery state in an active state, and the delivery state is used to indicate that a forwarding entry is to be delivered. The forwarding device 31, the forwarding device 32, and the forwarding device 33 may be border devices in different networks. For example, the forwarding device 31 may be a border device in a metropolitan area network or a data center (DC) network, the forwarding device 32 may be a border device in an ISP 1, and the forwarding device 33 may be a border device in an ISP 2.

TABLE 3

| Address prefix | Next hop | Entry state |
| --- | --- | --- |
| First address prefix | Address of the forwarding device 32 | Delivery state in an active state |
| Second address prefix | Address of the forwarding device 33 | Delivery state in an active state |

The method in this embodiment includes the following steps.

201. The control module of the network device obtains a route suppression request.

The route suppression request may carry an address match. The address match is used to determine the second routing entry from the first routing entry and the second routing entry, so as to determine a route corresponding to a long mask. The address match may be the first address prefix or the second address prefix.

The route suppression request may be a packet message sent by a routing control device such as a controller, or may be a configuration command or the like configured by a user.

202. The control module determines the second routing entry.

The control module may determine the second routing entry based on the address match.

When the control module determines the second routing entry, a determining rule may be that a mask is greater than a mask in the address match, and that an address prefix is totally or partially the same as the address match. For example, the address match is the second address prefix, such as 9.1.0.0/16. The control module determines, based on 9.1.0.0/16, that a mask 16 is greater than a mask 8, and that the address prefix of the second routing entry is totally the same as 9.1.0.0/16, so as to determine the second routing entry.

Alternatively, the determining rule may be that a mask is greater than a mask in the address match, and that a network segment to which an address prefix belongs is a subset of a network segment to which the address match belongs. For example, the address match is the first address prefix, such as 9.0.0.0/8. The control module determines that a mask 16 is greater than a mask 8, and that the network segment to which the address prefix of the second routing entry belongs is a subset of a network segment to which 9.0.0.0/8 belongs, so as to determine the second routing entry.

203. The control module sets a state of the second routing entry to a non-delivery state, where the non-delivery state is used to indicate that the second routing entry does not need to be delivered to a forwarding table.

In this embodiment of the present invention, after determining the second routing entry, the control module sets a state of the second routing entry, to suppress the route corresponding to the second routing entry, that is, the route corresponding to the long mask. A routing entry is periodically delivered to the forwarding table. Therefore, after the state of the second routing entry is set to the non-delivery state, the second routing entry is not delivered to the forwarding table in next delivery of a routing entry. The forwarding table is located in a forwarding module corresponding to the control module. Therefore, when a packet is to be forwarded, the forwarding module does not forward the packet based on the route corresponding to the second routing entry.

When the state of the second routing entry is set to the non-delivery state, the second routing entry may be set to an in-active state, or the second routing entry may be set to a rib-only state in an active state. For example, as shown in Table 4, the second routing entry is set to the in-active or rib-only state. The rib-only state is a state in which storage is performed only in a routing table, and indicates that a routing entry does not need to be delivered to the forwarding table of the forwarding module.

TABLE 4

| Address prefix | Next hop | Entry state |
|---|---|---|
| First address prefix | Address of the forwarding device 02 | Delivery state in an active state |
| Second address prefix | Address of the forwarding device 03 | In-active or rib-only state |

It can be learned from the foregoing technical solutions that, in this embodiment of the present invention, the network device has the first routing entry and the second routing entry, the address prefix of the first routing entry is the first address prefix, and the address prefix of the second routing entry is the second address prefix. The mask in the second address prefix is greater than the mask in the first address prefix. To be specific, the route corresponding to the second routing entry is the route corresponding to the long mask. In addition, the network segment to which the second address prefix belongs is the subset of the network segment to which the first address prefix belongs. After obtaining the route suppression request, the control module of the network device can determine the second routing entry, and set the state of the second routing entry to the non-delivery state to indicate that the second routing entry does not need to be delivered to the forwarding table. The route corresponding to the second routing entry is the route corresponding to the long mask. Therefore, when a packet is to be forwarded, the route corresponding to the long mask is not selected for the packet based on the second routing entry, so as to select, by suppressing the route corresponding to the long mask, the route corresponding to the short mask.

This embodiment of the present invention may be applied to a plurality of forwarding scenarios. In different forwarding scenarios, the network device is separately corresponding to different devices. Details are described below.

Figure 4:
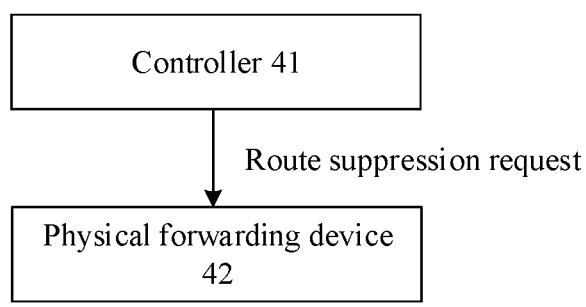
FIG. 4 is a schematic structural diagram of a forwarding scenario according to an embodiment of the present invention.

In a first forwarding scenario, the network device is a physical forwarding device. The physical forwarding device is a forwarding device that has a dedicated hardware structure, such as a router or a switch that has a dedicated hardware structure. The control module is a control module of the physical forwarding device. FIG. 4 shows an example forwarding scenario in the first forwarding scenario. The forwarding scenario includes a physical controller 41 and a physical forwarding device 42. A control module of the physical forwarding device 42 receives a route suppression request sent by the physical controller 41. The physical controller 41 is a controller that has a dedicated hardware structure, such as a main control board or a control card.

In a second forwarding scenario, the network device is a first virtual machine deployed on a general physical server, and the control module is a control module of the first virtual machine. In actual, in this scenario, a virtualization technology is used to perform virtualization to obtain a virtual machine (VM) that runs a program used to provide a function of a forwarding device. The virtual machine is the network device, and a control module of the virtual machine is the control module of the network device.

The virtualization technology is briefly described below: A general physical server can be virtualized into a plurality of logical computers by using the virtualization technology, and each logical computer is one virtual machine on the general physical server. The virtual machines may run different operating systems. Therefore, an application program of each virtual machine may run within space of an operating system independent of another operating system. To be specific, a virtual machine is a complete computer system that is simulated by using software, that has a function of a complete hardware system, and that runs in a totally isolated environment.

Figure 5:
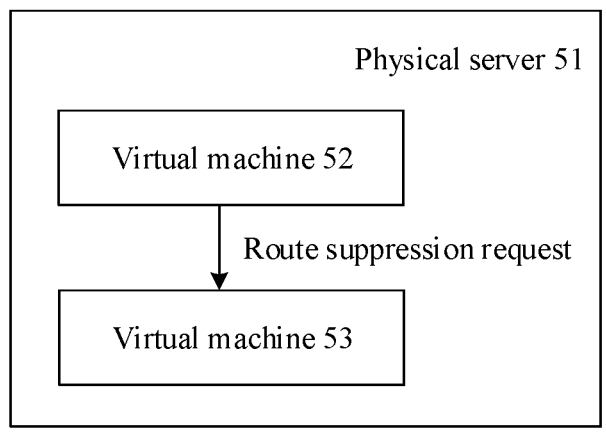
FIG. 5 is a schematic structural diagram of another forwarding scenario according to an embodiment of the present invention.

FIG. 5 shows an example forwarding scenario in the second forwarding scenario. The forwarding scenario includes a virtual machine 52 and a virtual machine 53. The virtual machine 52 runs a program used to provide a function of a controller for physical server 51. The virtual machine 53 runs a program used to provide a function of a forwarding device for physical server 51. A control module of the virtual machine 53 receives a route suppression request sent by the virtual machine 52.

It should be noted that, alternatively, the virtual machine 52 and the virtual machine 53 may be deployed on different general physical servers.

In a third forwarding scenario, the network device includes a second virtual machine deployed on a general physical server, and the control module is the second virtual machine. In actual, in this scenario, a virtualization technology is used to perform virtualization to obtain a virtual machine that runs a program used to provide a function of a control module of a forwarding device. The virtual machine is the control module. The network device includes the control module and a forwarding module. The forwarding module provides a packet forwarding function, and may be independently deployed on the virtual machine of the general physical server, or may be directly deployed on the general physical server, or may be deployed on a dedicated physical hardware device.

Figure 6:
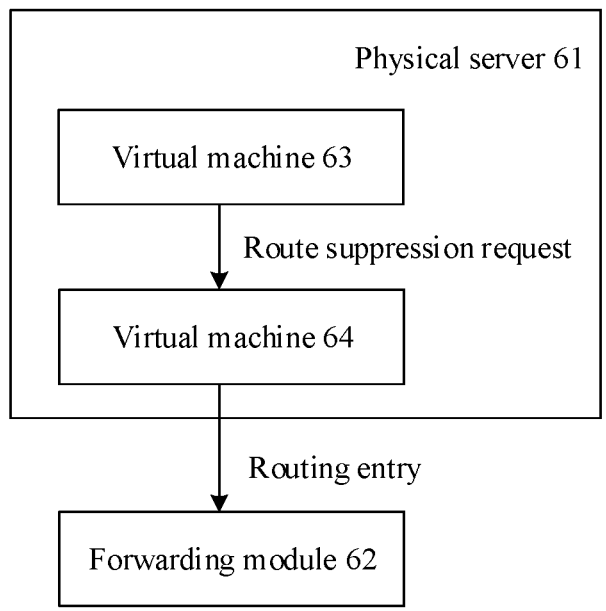
FIG. 6 is a schematic structural diagram of another forwarding scenario according to an embodiment of the present invention.

FIG. 6 shows an example forwarding scenario in the third forwarding scenario. The forwarding scenario includes a virtual machine 63, a virtual machine 64, and a forwarding module 62. The virtual machine 63 runs a program used to provide a function of a controller for physical server 61. The virtual machine 64 runs a program used to provide a function of a control module of a forwarding device for physical server 61. The virtual machine 64 receives a route suppression request sent by the virtual machine 63, and delivers a routing entry to the forwarding module 62. The forwarding module may be an independent virtual machine.

In this embodiment of the present invention, to avoid impact on packet forwarding, before step 203 of setting a state of the second routing entry to a non-delivery state, whether the first routing entry needs to be delivered to the forwarding table may be further determined. If the first routing entry needs to be delivered to the forwarding table, step 203 continues to be performed. Specifically, in this embodiment of the present invention, before step 203, the method may further include: determining, by the control module, that the first routing entry is in a delivery state in an active state. The control module may determine the first routing entry based on the address match. The network segment to which the second address prefix belongs is the subset of the network segment to which the first address prefix belongs. Therefore, even if the second routing entry is not delivered to the forwarding table, the forwarding module corresponding to the control module may forward the packet at least based on the route corresponding to the first routing entry, so as to avoid a case in which the packet cannot be forwarded. Alternatively, if in this embodiment of the present invention, it is determined that the first routing entry does not need to be delivered to the forwarding table, for example, the first routing entry is in an in-active state or a rib-only state, step 203 may not be performed in this embodiment of the present invention, so as to ensure that packet forwarding is not affected.

For example, in a topology shown in FIG. 3, an address match obtained by a control module of the forwarding device 31 is the first address prefix, and the control module of the forwarding device 31 determines the first routing entry based on the first address prefix. If the control module of the forwarding device 31 determines that the first routing entry is in the delivery state in the active state, the control module performs step 203, to be specific, sets the state of the second routing entry to the non-delivery state. Therefore, even if the destination address of the packet matches both the second routing entry and the first routing entry, a forwarding module of the forwarding device 31 does not forward the packet to the forwarding device 33 based on the route corresponding to the second routing entry, but may forward the packet to the forwarding device 32 based on a forwarding entry corresponding to the first routing entry. If the control module of the forwarding device 31 determines that the first routing entry is in an in-active state or a rib-only state, the control module does not perform step 203. Therefore, the forwarding module of the forwarding device 31 forwards the packet to the forwarding device 33 based on the route corresponding to the second routing entry.

In this embodiment of the present invention, after step 203 in which the control module sets a state of the second routing entry, the method may further include: delivering, by the control module, the first routing entry to the forwarding table. The second routing entry is not delivered to the forwarding table, so that the forwarding module corresponding to the control module selects, based on the first routing entry, the route corresponding to the short mask.

In this embodiment of the present invention, the control module may receive a route suppression request sent by a routing control device. The routing control device may be a controller in software-defined networking (SDN). The routing control device may be a network management device, a traffic analysis server, an orchestrator, or the like in non-SDN. The following describes another embodiment of a routing control method by using a controller side as an execution entity.

Figure 7:
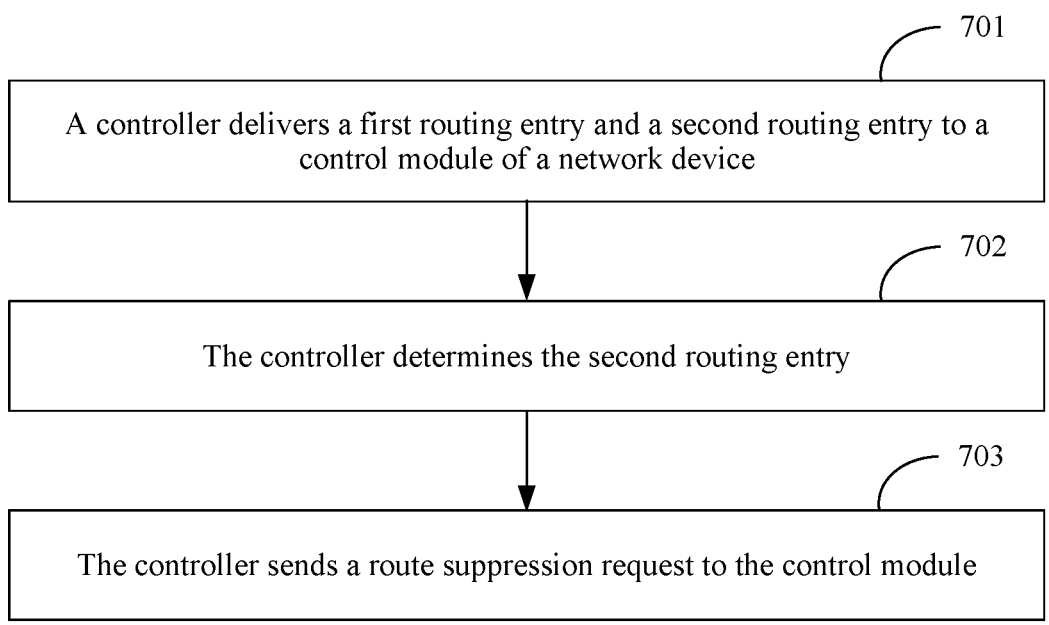
FIG. 7 is a schematic flowchart of another method embodiment according to an embodiment of the present invention.

Referring to FIG. 7, an embodiment of the present invention provides another method embodiment of a routing control method. This embodiment may be applied to a controller.

701. The controller delivers a first routing entry and a second routing entry to a control module of a network device, where an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix.

After calculating the first routing entry and the second routing entry, the controller may deliver the calculated entries to the control module. After receiving the first routing entry and the second routing entry, the control module may store the first routing entry and the second routing entry in the network device.

702. The controller determines the second routing entry.

The controller may automatically determine, based on the first routing entry and the second routing entry, that the second routing entry needs to be suppressed; or may determine, by detecting a suppression operation performed by a user, that the second routing entry needs to be suppressed.

703. The controller sends a route suppression request to the control module, where the route suppression request is used to instruct the control module to set a state of the second routing entry to a non-delivery state, and the non-delivery state is used to indicate that the second routing entry does not need to be delivered to a forwarding table. The route suppression request may carry an address match, and the control module determines the second routing entry based on the address match. For related content in this embodiment, refer to that in the embodiment corresponding to FIG. 2. Details are not described herein.

In this embodiment of the present invention, the controller may be a controller that has a dedicated hardware structure, and the controller that has a dedicated hardware structure may be a device, a main control board, a control card, or the like that has a dedicated hardware structure. Alternatively, the controller may be a controller implemented by installing software on a general physical server, or a virtual machine deployed on a general physical server, that is, a virtual machine that is obtained by performing virtualization by using a virtualization technology and that runs a program used to provide a function of a controller. The controller may be applied to any one of the forwarding scenarios in FIG. 4 to FIG. 6.

In this embodiment of the present invention, alternatively, the controller may not send the route suppression request to the control module. After determining the second routing entry, the controller does not deliver the second routing entry to the control module in step 701, so that a route corresponding to a long mask can also be suppressed.

In this embodiment of the present invention, a Border Gateway Protocol (BGP) flow specification (FlowSpec) message may be extended to add the address match to the message. Details are described below.

Currently, the BGP Flow Spec message is used to control attack traffic. The message includes network layer reachability information (NLRI) and an extended community attribute. The RFC (Request For Comments) 5575 defines 12 commonly-used traffic matching rules, for example, including a destination address, a source address, an IP number, and a port number. The 12 rules are encapsulated in the NLRI of the message. In addition, the RFC 5575 defines four commonly-used traffic processing behaviors, for example, including discarding traffic, rate limiting, and redirecting traffic to a virtual private network (VPN). The four processing behaviors are carried in the extended community attribute.

In this embodiment of the present invention, the route suppression request may be specifically a BGP FlowSpec message, NLRI of the BGP FlowSpec message carries the address match, and an extended community attribute of the BGP FlowSpec message carries a suppression action corresponding to the address match. For example, the suppression action may instruct to set the state of the second routing entry to an in-active state or a rib-only state. Therefore, after receiving the BGP FlowSpec message, the control module can obtain the address match from the NLRI of the message, and obtain the suppression action from the extended community attribute of the message, so as to set the state of the second routing entry to the non-delivery state based on the suppression action. The address match may be the first address prefix or the second address prefix.

For example, as shown in Table 5, when a type is TBD 1, the address match is the first address prefix, and the TBD 1 instructs to determine the second routing entry based on the first address prefix and set the state of the second routing entry to a rib-only state. TBD 2 instructs to determine the second routing entry based on the first address prefix and set the state of the second routing entry to an in-active state.

TABLE 5

| Type | Extended communityattribute | Actual action |
| --- | --- | --- |
| TBD 1 | Set a specific route to a rib-only state | Determine the second routing entry based on the first address prefix, and set the state of the second routing entry to a rib-only state |
| TBD 2 | Set a specific route to an in-active state | Determine the second routing entry based on the first address prefix, and set the state of the second routing entry to an in-active state |

A route corresponding to the second routing entry is a specific route of a route corresponding to the first routing entry. TBD represents to be defined (to be defined). After the Internet Engineering Task Force (IETF) formally allocates a value, the TBD uses the value specified by the IETF.

Alternatively, the route suppression request may be a configuration command, and the configuration command carries the address match and a suppression action corresponding to the address match. The configuration command may be obtained after the network device performs local configuration, or may be sent by another device to the control module. For example, the another device sends the configuration command to the control module by using the Netconf protocol, to use the configuration command as a policy used when the control module delivers a routing entry. The control module sets the state of the second routing entry to the non-delivery state based on the suppression action in the configuration command. The address match may be the first address prefix or the second address prefix.

In this embodiment of the present invention, after the state of the second routing entry is set, the state of the second routing entry may be further restored, so that the second routing entry can be delivered to the forwarding table. For example, when a state of the first routing entry changes from a delivery state in an active state to an in-active state or a rib-only state, the control module may restore the state of the second routing entry to a delivery state in an active state. For another example, the control module restores, based on a suppression cancellation request or a configuration command, the state of the second routing entry to a delivery state in an active state. For example, the control module sets the state of the second routing entry to an in-active state or a rib-only state after receiving an extended BGP Flow Spec update message, and sets the state of the second routing entry to the delivery state in the active state after receiving an extended BGP Flow Spec cancellation message.

In this embodiment of the present invention, the address match is the first address prefix, and in addition to the second routing entry, it can be further determined that a route corresponding to a third routing entry is a route corresponding to a long mask. To be specific, the network device further has the third routing entry, an address prefix of the third routing entry is a third address prefix, a network segment to which the third address prefix belongs is also a subset of the network segment to which the first address prefix belongs, and a mask in the third address prefix is also greater than the mask in the first address prefix. In this case, in this embodiment of the present invention, a state of the third routing entry may be set to a non-delivery state, so that the third routing entry does not need to be delivered to the forwarding table; or a state of the third routing entry may not be changed, so that the third routing entry can still be delivered to the forwarding table. Description is separately provided below.

Optionally, the method further includes: determining, by the control module, the third routing entry based on the address match; and setting, by the control module, the state of the third routing entry to the non-delivery state, so that the third routing entry does not need to be delivered to the forwarding table. For example, the first address prefix is 9.0.0.0/8, the second address prefix is 9.1.0.0/16, and the third address prefix is 9.2.0.0/16. The control module may further set the third routing entry to an in-active state or a rib-only state. To be specific, in this embodiment, when it is determined, based on the first address prefix, that both the route corresponding to the second routing entry and the route corresponding to the third routing entry are routes corresponding to a long mask, both of the two routes corresponding to a long mask may be suppressed.

Optionally, the method further includes: obtaining, by the control module, a subnet range match; and determining, by the control module, the second routing entry based on the address match and the subnet range match in 202. For example, the first address prefix is 9.0.0.0/8, the second address prefix is 9.1.0.0/16, the third address prefix is 9.2.0.0/16, and the subnet match may be 9.1.0.0. The second routing entry may be determined based on the first address prefix and the subnet match. To be specific, in this embodiment, when it is determined, based on the first address prefix, that both the route corresponding to the second routing entry and the route corresponding to the third routing entry are routes corresponding to a long mask, a more specific subnet may be further specified, so that only the route corresponding to the second routing entry is suppressed, and the route corresponding to the third routing entry is not suppressed.

The following describes this embodiment of the present invention by using a specific scenario.

Figure 8:
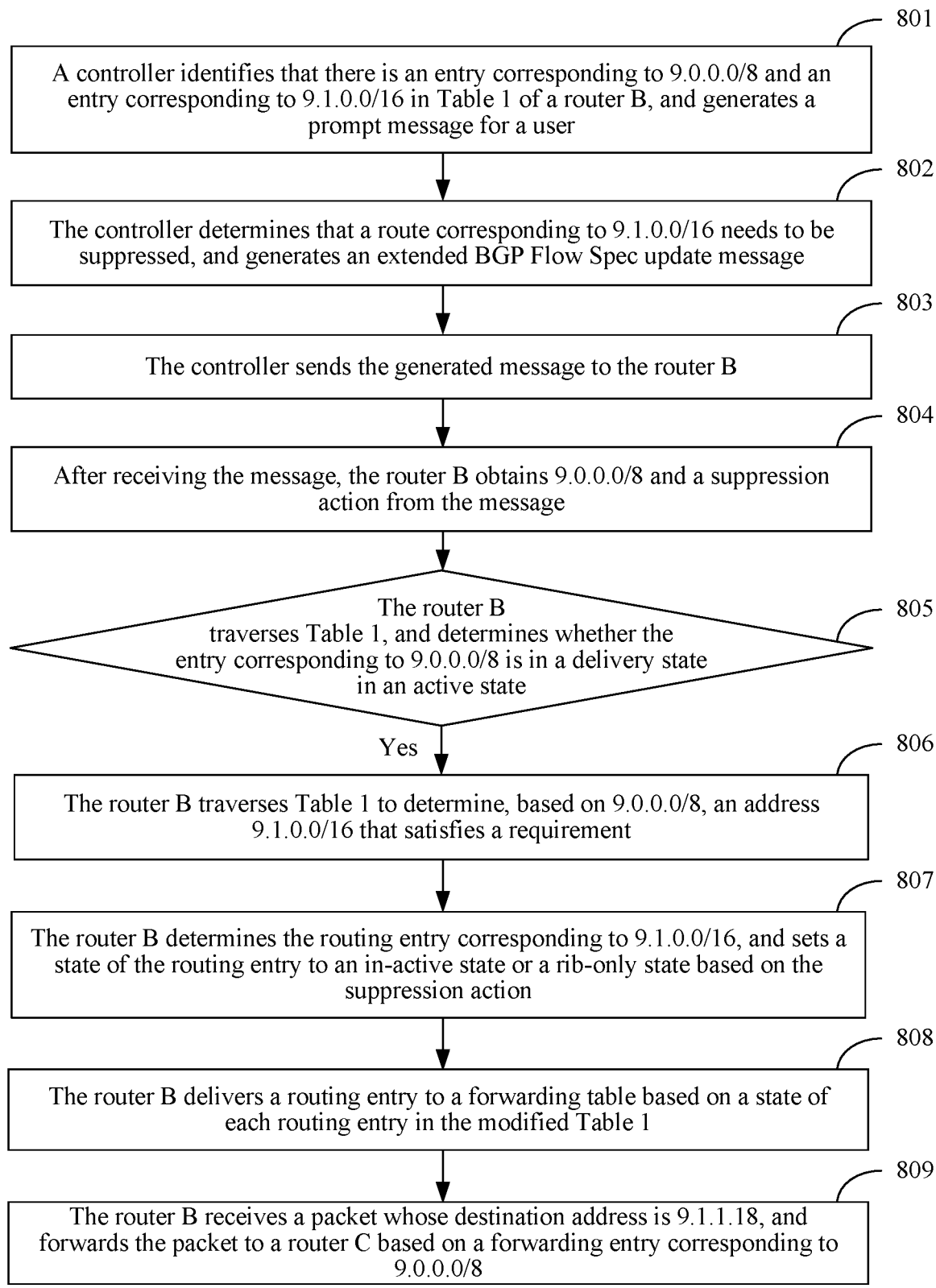
FIG. 8 is a schematic flowchart of another method embodiment according to an embodiment of the present invention.

Referring to FIG. 8, an embodiment of the present invention provides another method embodiment of a routing control method. This embodiment may be applied to a router B shown in FIG. 9.

Figure 9:
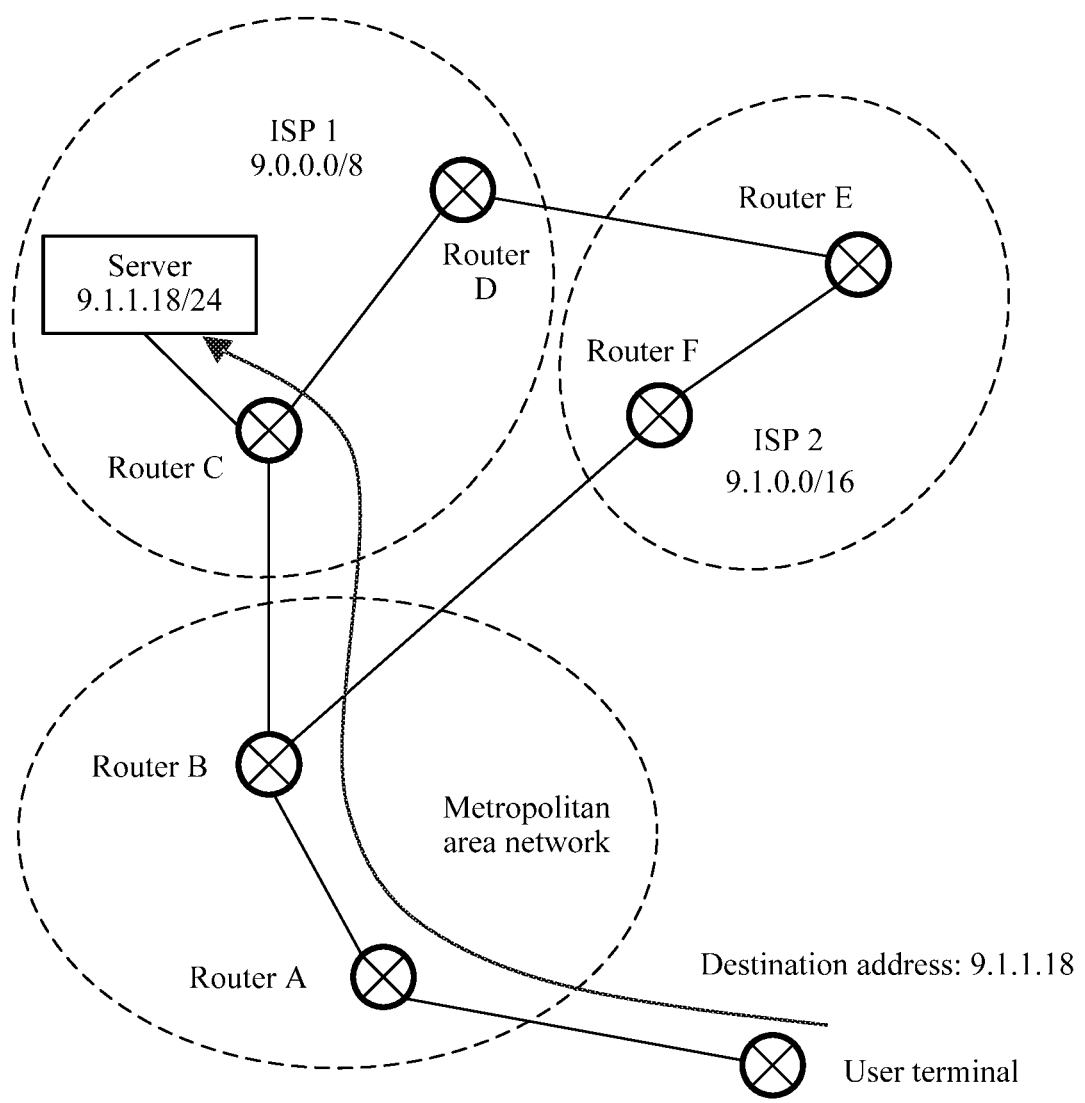
FIG. 9 is a schematic diagram of packet routing according to an embodiment of the present invention.

In a topology shown in FIG. 9, a metropolitan area network includes a router A and the router B. An ISP 1 includes a router C and a router D, and an ISP 2 includes a router E and a router F. In addition, the ISP 1 advertises an address prefix 9.0.0.0/8 to the metropolitan area network, and the ISP 1 also advertises an address prefix 9.1.0.0/16 to the ISP 2. The address prefix is advertised to the metropolitan area network by using the ISP 2. The router B has the routing table shown in Table 1.

801. A controller (not shown in the figure) identifies that there is an entry corresponding to 9.0.0.0/8 and an entry corresponding to 9.1.0.0/16 in Table 1 of the router B, and generates a prompt message for a user.

The message may indicate that a route corresponding to 9.1.0.0/16 is a specific route of a route corresponding to 9.0.0.0/8.

802. The controller determines that a route corresponding to 9.1.0.0/16 needs to be suppressed, and generates an extended BGP Flow Spec update message, where NLRI of the message carries 9.0.0.0/8, and an extended community attribute carries a suppression action, for example, the TBD 1 or the TBD 2 shown in Table 5.

A manager may formulate a routing control policy based on the prompt message displayed in step 801, to be specific, the user accesses a destination address of a network segment 9.1.0.0-9.1.255.255 by using the metropolitan area network, and forwards a packet at the ISP 1 direction, that is, suppresses the route corresponding to 9.1.0.0/16. The controller generates the extended BGP Flow Spec update message based on the policy.

803. The controller sends the generated message to the router B.

804. After receiving the message, the router B obtains 9.0.0.0/8 and the suppression action from the message.

805. The router B traverses Table 1 to determine the entry corresponding to 9.0.0.0/8; determines whether a state of the entry is a delivery state in an active state; and performs step 806 if the state of the entry is the delivery state in the active state; or if the state of the entry is not the delivery state in the active state, may end a procedure, or generate a forwarding table based on the local routing table.

806. The router B traverses Table 1 to determine, based on 9.0.0.0/8, an address 9.1.0.0/16 that satisfies a requirement. The requirement is that a mask is greater than 8, and that a network segment to which an address prefix belongs is a subset of a network segment to which 9.0.0.0/8 belongs.

807. The router B determines the routing entry corresponding to 9.1.0.0/16, and sets a state of the routing entry to an in-active state or a rib-only state based on the suppression action. For example, the suppression action is TBD 1, and the state of the routing entry is set to a rib-only state.

808. The router B delivers a routing entry to the forwarding table based on a state of each routing entry in the modified Table 1. In the modified Table 1, the state of the routing entry corresponding to 9.1.0.0/16 is an in-active state or a rib-only state. Therefore, the routing entry is not delivered to the forwarding table, but the routing entry corresponding to 9.0.0.0/8 is delivered to the forwarding table.

809. The router B receives a packet whose destination address is 9.1.1.18, and forwards, based on a forwarding entry corresponding to 9.0.0.0/8, the packet to a corresponding next-hop address 20.0.0.2, that is, an address of the router C, so that the packet is sent to the ISP 1, and finally is sent to a server connected to the ISP 1.

Steps 804 to 808 are performed by a control module of the router B, and step 809 is performed by a forwarding module of the router B.

It can be learned that, in this embodiment, when accessing a destination address of a network segment 9.1.0.0-9.1.255.255 by using the metropolitan area network, the user can forward the packet at an ISP 1 direction, so as to select, by suppressing a route corresponding to a long mask, a route corresponding to a short mask.

The foregoing describes the method embodiment of the routing control method in the embodiments of the present invention. The following describes related apparatuses in the embodiments of the present invention from a perspective of a modular functional entity.

Figure 10:
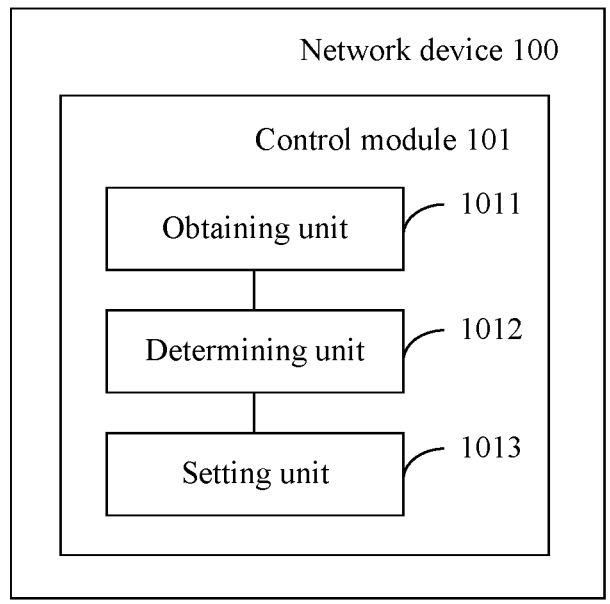
FIG. 10 is a schematic structural diagram of an apparatus embodiment of a network device according to an embodiment of the present invention.

Referring to FIG. 10, an embodiment of the present invention provides an apparatus embodiment of a network device. A network device 100 in this embodiment has a first routing entry and a second routing entry, an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix.

The network device 100 includes a control module 101. The control module 101 includes an obtaining unit 1011, a determining unit 1012, and a setting unit 1013.

The obtaining unit 1011 is configured to obtain a route suppression request.

The determining unit 1012 is configured to determine the second routing entry.

The setting unit 1013 is configured to set a state of the second routing entry to a non-delivery state. The non-delivery state is used to indicate that the second routing entry does not need to be delivered to a forwarding table.

For example, the network device 100 shown in FIG. 10 may be configured to perform the method shown in FIG. 2. Specifically, the obtaining unit 1011 may be configured to perform step 201 in FIG. 2, the determining unit 1012 may be configured to perform step 202 in FIG. 2, and the setting unit 1013 may be configured to perform step 203 in FIG. 2.

Optionally, the setting unit 1013 is specifically configured to: set the second routing entry to an in-active state, or set the second routing entry to a rib-only state in an active state.

Optionally, the route suppression request is a Border Gateway Protocol BGP flow specification FlowSpec message, network layer reachability information NLRI of the BGP FlowSpec message carries an address match, an extended community attribute of the BGP FlowSpec message carries a suppression action corresponding to the address match, and the address match is the first address prefix or the second address prefix. The setting unit 1013 is specifically configured to set the state of the second routing entry to the non-delivery state based on the suppression action.

Optionally, the route suppression request is a configuration command, and the configuration command carries an address match and a suppression action corresponding to the address match. The setting unit 1013 is specifically configured to set the state of the second routing entry to the non-delivery state based on the suppression action. The address match is the first address prefix or the second address prefix.

Optionally, the determining unit 1012 is further configured to: before the setting unit 1013 sets the state of the second routing entry to the non-delivery state, determine that the first routing entry is in a delivery state in an active state.

Optionally, the network device 100 further includes a delivery unit. The delivery unit is configured to deliver the first routing entry to the forwarding table after the setting unit 1013 sets the state of the second routing entry to the non-delivery state.

Optionally, the network device 100 is a physical forwarding device, and the control module 101 is a control module of the physical forwarding device; or the network device 100 is a first virtual machine deployed on a general physical server, and the control module 101 is a control module of the first virtual machine; or the network device 100 includes a second virtual machine deployed on a general physical server, and the control module 101 is the second virtual machine.

It should be noted that, for various specific implementations of the network device 100 in this embodiment, refer to the detailed description of the embodiment shown in FIG. 2. Details are not described herein.

Figure 11:
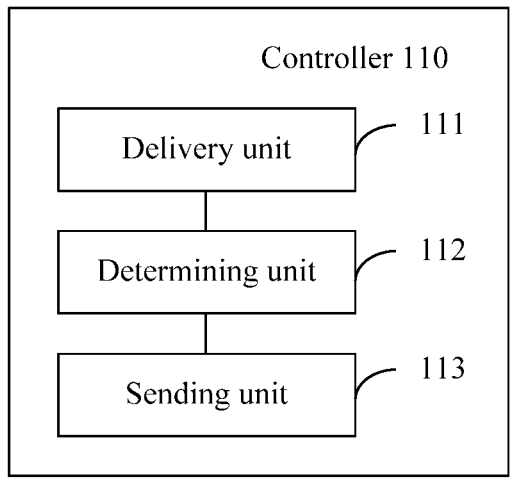
FIG. 11 is a schematic structural diagram of an apparatus embodiment of a controller according to an embodiment of the present invention.

Referring to FIG. 11, an embodiment of the present invention provides an apparatus embodiment of a controller.

A controller 110 in this embodiment includes a delivery unit 111, a determining unit 112, and a sending unit 113.

The delivery unit 111 is configured to deliver a first routing entry and a second routing entry to a control module of a network device. An address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix.

The determining unit 112 is configured to determine the second routing entry.

The sending unit 113 is configured to send a route suppression request to the control module. The route suppression request is used to instruct the control module to set a state of the second routing entry to a non-delivery state, and the non-delivery state is used to indicate that the second routing entry does not need to be delivered to a forwarding table.

For example, the controller 110 shown in FIG. 11 may be configured to perform the method shown in FIG. 7. Specifically, the delivery unit 111 may be configured to perform step 701 in FIG. 7, the determining unit 112 may be configured to perform step 702 in FIG. 7, and the sending unit 113 may be configured to perform step 703 in FIG. 7.

Optionally, the route suppression request is used to instruct the control module to set the second routing entry to an in-active state, or set the second routing entry to a rib-only state in an active state.

Optionally, the route suppression request is a Border Gateway Protocol BGP flow specification FlowSpec message, network layer reachability information NLRI of the BGP FlowSpec message carries an address match, an extended community attribute of the BGP FlowSpec message carries a suppression action corresponding to the address match, the suppression action is used to instruct the control module to set the state of the second routing entry to the non-delivery state based on the suppression action, and the address match is the first address prefix or the second address prefix.

Optionally, the route suppression request is a configuration command, the configuration command carries an address match and a suppression action corresponding to the address match, the suppression action is used to instruct the control module to set the state of the second routing entry to the non-delivery state based on the suppression action, and the address match is the first address prefix or the second address prefix.

Optionally, the controller is a controller that has a dedicated hardware structure, a controller implemented by installing software on a general physical server, or a virtual machine deployed on a general physical server.

It should be noted that, for various specific implementations of the controller 110 in this embodiment, refer to the detailed description of the embodiment shown in FIG. 7. Details are not described herein.

Figure 12:
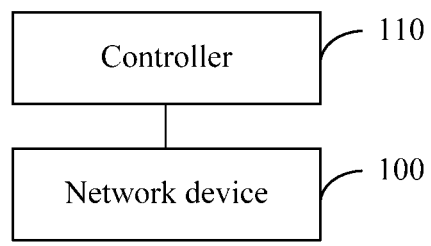
FIG. 12 is a schematic structural diagram of an apparatus embodiment of a network system according to an embodiment of the present invention.

Referring to FIG. 12, an embodiment of the present invention provides a system embodiment of a network system. In this embodiment, the system includes a network device 100 and a controller 110. The network device 100 may be a network device in any one of the foregoing implementations, and the controller 110 may be a controller in any one of the foregoing implementations.

For various specific implementations of the controller 100 and the controller 110 in this embodiment, refer to the detailed description of the embodiments shown in FIG. 2, FIG. 7, FIG. 10, and FIG. 11. Details are not described in this embodiment.

The foregoing describes the related apparatuses in the embodiments of the present invention from the perspective of the modular functional entity. The following describes related apparatuses in the embodiments of the present invention from a perspective of hardware processing.

Figure 13:
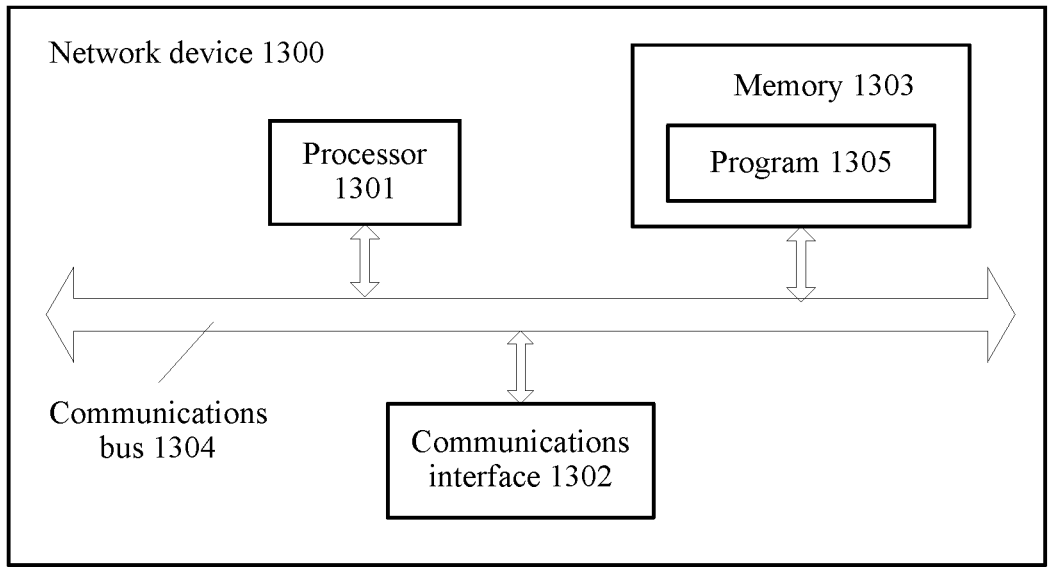
FIG. 13 is a schematic structural diagram of another apparatus embodiment of a network device according to an embodiment of the present invention.

Referring to FIG. 13, an embodiment of the present invention provides another apparatus embodiment of a network device. In this embodiment, a network device 1300 has a first routing entry and a second routing entry, an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix.

The network device 1300 in this embodiment specifically includes a control module, a communications interface (Communications Interface) 1302, a memory (memory) 1303, and a communications bus 1304. The control module includes a processor (processor) 1301.

The processor 1301, the communications interface 1302, and the memory 1303 complete communication with each other by using the bus 1304.

The processor 1301 is configured to execute a program 1305.

Specifically, the program 1305 may include program code, and the program code includes a computer operation instruction.

The processor 1301 may be a central processing unit CPU, an application-specific integrated circuit ASIC (Application-Specific Integrated Circuit), or one or more integrated circuits configured to implement this embodiment of this application.

The memory 1303 is configured to store the program 1305. The memory 1303 may include a high-speed RAM memory, and may further include a non-volatile memory (non-volatile memory), for example, at least one disk memory. The program 1305 is used to perform the following steps:

obtaining a route suppression request;
determining the second routing entry; and
setting a state of the second routing entry to a non-delivery state, where the non-delivery state is used to indicate that the second routing entry does not need to be delivered to a forwarding table.

For specific implementation of the steps in the program 1305, refer to implementations of corresponding steps in the embodiment shown in FIG. 2. Details are not described herein.

The functional units of the network device 1300 provided in this embodiment may be specific implementation based on functions of the method embodiment shown in FIG. 2 and the apparatus embodiment shown in FIG. 10. Definition and description of terms are consistent with those in the method embodiment shown in FIG. 2 and the apparatus embodiment shown in FIG. 10. Details are not described herein.

Figure 14:
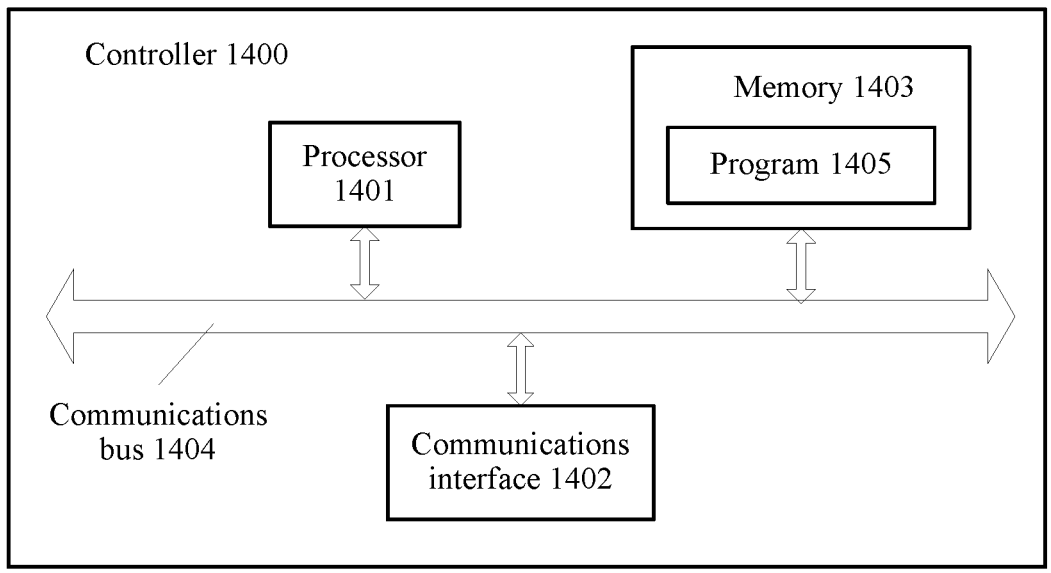
FIG. 14 is a schematic structural diagram of another apparatus embodiment of a controller according to an embodiment of the present invention.

Referring to FIG. 14, an embodiment of the present invention provides another apparatus embodiment of a controller.

A controller 1400 in this embodiment specifically includes a processor (processor) 1401, a communications interface (Communications Interface) 1402, a memory (memory) 1403, and a communications bus 1404.

The processor 1401, the communications interface 1402, and the memory 1403 complete communication with each other by using the bus 1404.

The processor 1401 is configured to execute a program 1405.

Specifically, the program 1405 may include program code, and the program code includes a computer operation instruction.

The processor 1401 may be a central processing unit CPU, an application-specific integrated circuit ASIC (Application-Specific Integrated Circuit), or one or more integrated circuits configured to implement this embodiment of this application.

The memory 1403 is configured to store the program 1405. The memory 1403 may include a high-speed RAM memory, and may further include a non-volatile memory (non-volatile memory), for example, at least one disk memory. The program 1405 is used to perform the following steps:

delivering a first routing entry and a second routing entry to a control module of a network device, where an address prefix of the first routing entry is a first address prefix, an address prefix of the second routing entry is a second address prefix, a network segment to which the second address prefix belongs is a subset of a network segment to which the first address prefix belongs, and a mask in the second address prefix is greater than a mask in the first address prefix;

determining the second routing entry; and sending a route suppression request to the control module, where the route suppression request is used to instruct the control module to set a state of the second routing entry to a non-delivery state, and the non-delivery state is used to indicate that the second routing entry does not need to be delivered to a forwarding table.

For specific implementation of the steps in the program 1405, refer to implementations of corresponding steps in the embodiment shown in FIG. 7. Details are not described herein.

The functional units of the network device 1400 provided in this embodiment may be specific implementation based on functions of the method embodiment shown in FIG. 7 and the apparatus embodiment shown in FIG. 11. Definition and description of terms are consistent with those in the method embodiment shown in FIG. 7 and the apparatus embodiment shown in FIG. 11. Details are not described herein.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A routing control method, comprising:
   obtaining, by a network device, a route suppression request, wherein the network device has a first routing entry having a first address prefix and a second routing entry having a second address prefix, wherein a network segment to which the second address prefix belongs is a subset of a network segment to which the first address prefix belongs; and
   determining, by the network device according to the route suppression request, the second routing entry, wherein the second routing entry does not need to be delivered to a forwarding table, and wherein a mask in the second address prefix is greater than a mask in the first address prefix.

2. The method according to claim 1, further comprising:
   setting, by the network device, a state of the second routing entry to a non-delivery state.

3. The method according to claim 2, wherein the setting, by the network device, a state of the second routing entry to a non-delivery state comprises:
setting, by the network device, the second routing entry to an inactive state, or setting the second routing entry to a rib-only state in an active state.

4. The method according to claim 1, wherein:
the route suppression request is a Border Gateway Protocol (BGP) flow specification (FlowSpec) message, network layer reachability information (NLRI) of the BGP FlowSpec message carries an address match, an extended community attribute of the BGP FlowSpec message carries a suppression action corresponding to the address match, and the address match is the first address prefix or the second address prefix; and
the setting, by the network device, a state of the second routing entry to a non-delivery state comprises:
setting, by the network device, the state of the second routing entry to the non-delivery state based on the suppression action.

5. The method according to claim 1, wherein the route suppression request includes a configuration command that carries an address match and a suppression action corresponding to the address match, and the address match is the first address prefix or the second address prefix; and
the setting, by the network device, a state of the second routing entry to a non-delivery state comprises:
setting, by the network device, the state of the second routing entry to the non-delivery state based on the suppression action.

6. The method according to claim 1, wherein before the setting a state of the second routing entry to a non-delivery state, the method further comprises:
determining, by the network device, that the first routing entry is in a delivery state in an active state.

7. The method according to claim 6, wherein after the setting a state of the second routing entry to a non-delivery state, the method further comprises:
delivering, by the network device, the first routing entry to the forwarding table.

8. A routing control method, comprising:
delivering, by a controller, a first routing entry having a first address prefix and a second routing entry having a second address prefix to a network device, wherein a network segment to which the second address prefix belongs is a subset of a network segment to which the first address prefix belongs; and
sending, by the controller, a route suppression request to the network device to instruct the network device not to deliver the second routing entry to a forwarding table, wherein a mask in the second address prefix is greater than a mask in the first address prefix.

9. The method according to claim 8, further comprising:
determining, by the controller, the second routing entry.

10. The method according to claim 8, wherein the route suppression request instructs the network device to set a state of the second routing entry to a non-delivery state, and the non-delivery state instructs the network device not to deliver the second routing entry to a forwarding table.

11. The method according to claim 10, wherein the non-delivery state comprises an in-active state, or a rib-only state in an active state.

12. The method according to claim 8, wherein the route suppression request is a Border Gateway Protocol (BGP) flow specification (FlowSpec) message, network layer reachability information (NLRI) of the BGP FlowSpec message carries an address match, an extended community attribute of the BGP FlowSpec message carries a suppression action corresponding to the address match, the suppression action instructs the network device not to deliver the second routing entry to a forwarding table, and the address match is the first address prefix or the second address prefix.

13. The method according to claim 8, wherein the route suppression request is a configuration command that carries an address match and a suppression action corresponding to the address match, the suppression action instructs the network device not to deliver the second routing entry to a forwarding table, and the address match is the first address prefix or the second address prefix.

14. A network device, comprising one or more processors configured to execute instructions and cause the network device to:
obtain a route suppression request; and
determine, according to the route suppression request, a second routing entry in the network device, and wherein the second routing entry does not need to be delivered to a forwarding table, wherein a mask in a second address prefix is greater than a mask in a first address prefix.

15. The network device according to claim 14, wherein the network device is further caused to:
set a state of the second routing entry to a non-delivery state.

16. The network device according to claim 15, wherein the non-delivery state comprises: an in-active state, or a rib-only state in an active state.

17. The network device according to claim 15, wherein:
the route suppression request is a Border Gateway Protocol (BGP) flow specification (FlowSpec) message, network layer reachability information (NLRI) of the BGP FlowSpec message carries an address match, an extended community attribute of the BGP FlowSpec message carries a suppression action corresponding to the address match, and the address match is the first address prefix or the second address prefix; and
the state of the second routing entry is set to the non-delivery state based on the suppression action.

18. The network device according to claim 15, wherein the route suppression request includes a configuration command that carries an address match and a suppression action corresponding to the address match, and the address match is the first address prefix or the second address prefix; and
the state of the second routing entry is set to the non-delivery state based on the suppression action.

19. A controller, comprising one or more processors configured to execute instructions and cause the controller to:
deliver a first routing entry having a first address prefix and a second routing entry having a second address prefix to a network device, wherein a network segment to which the second address prefix belongs is a subset of a network segment to which the first address prefix belongs; and
send a route suppression request to the network device to instruct the network device not to deliver the second routing entry to a forwarding table, wherein a mask in the second address prefix is greater than a mask in the first address prefix.

20. The controller according to claim 19, wherein the route suppression request is configured to instruct the network device to set a state of the second routing entry to a non-delivery state which instructs the network device not to deliver the second routing entry to a forwarding table.

21. The controller according to claim 20, wherein the non-delivery state comprises an in-active state, or a rib-only state in an active state.

22. A network system, comprising:
a controller, configured to:
deliver a first routing entry having a first address prefix and a second routing entry having a second address prefix to a network device, wherein a network segment to which the second address prefix belongs is a subset of a network segment to which the first address prefix belongs;
send a route suppression request to the network device to instruct the network device not to deliver the second routing entry to a forwarding table, wherein a mask in the second address prefix is greater than a mask in the first address prefix; and
a network device, configured to:
obtain the route suppression request; and
determine, according to the route suppression request, a second routing entry in the network device, and wherein the second routing entry does not need to be delivered to a forwarding table.

23. The network system according to claim 22, wherein the route suppression request is configured to instruct the network device to set a state of the second routing entry to a non-delivery state which instructs the network device not to deliver the second routing entry to a forwarding table.

24. The network system according to claim 23, wherein the non-delivery state comprises an in-active state, or a rib-only state in an active state.

* * * * *